United States Patent [19]

Varghese et al.

[11] Patent Number: 5,673,171
[45] Date of Patent: Sep. 30, 1997

[54] HARD DISC DRIVE SUPPORT TRAY APPARATUS WITH BUILT-IN HANDLING SHOCK REDUCTION, EMI SHIELDING AND MOUNTING ALIGNMENT STRUCTURES

[75] Inventors: Paily T. Varghese, Tomball; Robert J. Hastings, Kingwood; William D. Lobato, Spring, all of Tex.

[73] Assignee: Compaq Computer Corporation, Houston, Tex.

[21] Appl. No.: 567,566

[22] Filed: Dec. 5, 1995

[51] Int. Cl.$^6$ .............................. G06F 1/16; H05K 7/10; H05K 9/00
[52] U.S. Cl. .............. 361/685; 248/615; 361/727; 361/818
[58] Field of Search ......... 364/708.1; 360/97.01–98.01, 360/137; 248/581, 605, 615, 671, 674, 632, 634, 638; 361/685, 725–727, 818; 369/75.1, 263

[56] References Cited

U.S. PATENT DOCUMENTS

| | | | |
|---|---|---|---|
| 5,340,340 | 8/1994 | Hasting et al. | 361/685 X |
| 5,463,527 | 10/1995 | Hager et al. | 361/685 |
| 5,548,480 | 8/1996 | Rudi et al. | 361/685 |

*Primary Examiner*—Michael W. Phillips
*Attorney, Agent, or Firm*—Konneker & Smith

[57] ABSTRACT

A series of hard disk drives are anchored to the top sides of perforated metal plates disposed above the top sides of molded plastic support trays in parallel relationships therewith. Sets of spaced apart elastomeric cushioning members have upper portions captively retained between each metal plate and its associated plastic tray, and lower portions projecting downwardly beyond the tray. Small connector circuit boards are anchored to rear end portions of the metal plates, and opposite side edge portions of the plates are slidably insertable into guide channel members within a cage structures to create a hot plug connection between the circuit boards and corresponding hot plug connectors on a rear wall of the cage. Ramped alignment projections formed on the opposite plate side wall portions automatically compensate for vertical and horizontal dimensional variations in the tray supporting portions of the cage; the elastomeric members function to reduce handling shock transmitted to the mounted disk drives; and the metal plates form underside EMI shielding structures for the mounted disk drives.

19 Claims, 4 Drawing Sheets

HARD DISC DRIVE SUPPORT TRAY APPARATUS WITH BUILT-IN HANDLING SHOCK REDUCTION, EMI SHIELDING AND MOUNTING ALIGNMENT STRUCTURES

BACKGROUND OF THE INVENTION

1. Field of the Invention

The present invention relates generally to the mounting and support of hard disk drives for computers, and more particularly relates to apparatus for removably supporting a plurality of hot plug-connected hard disk drives.

2. Description of Related Art

Hard disk drives for a file server or other computer are often mounted, in a vertically spaced array external to the file server, in a rectangular sheet metal "cage" structure within an external disk drive support housing. For operational convenience and flexibility, each disk drive is typically "hot plug" connected within the support housing. This type of electrical connection permits any of the supported disk drives to be removed and re-installed within the support housing without disturbing the operation of the other disk drives.

Under a conventional practice, each disk drive is mounted atop a printed circuit board having a rear card edge portion which is insertable into a back plane hot plug socket within the cage structure. To install each disk drive within the cage, side edge portions of its supporting printed circuit board are inserted into a pair of track members mounted on opposed side wall portions of the cage and then slid rearwardly along the tracks until the rear card edge portion of the circuit board is operatively received its associated hot plug socket at the back of the cage.

Some or all of the following problems, limitations and disadvantages are commonly associated with conventional hot plug disk drive support apparatus of this general type:

1. The use of a printed circuit board to underlie and carry each hard disk drive tends to increase both the complexity and cost associated with removably supporting each disk drive, and additionally presents sharp solder and wire points along the underside of the board which the installer must carefully handle to avoid scratches and nicks in his fingers when installing and removing the disk drive from the cage.

2. On some circuit board-supported disk drives, a considerable amount of manual pulling force is required to disconnect the board from its associated hot plug socket within the cage. On other conventionally supported disk drives, the circuit board is provided with pivotable ejection latches that must be screwed or pinned to the circuit board, thereby increasing the overall complexity and fabricational cost of the support system.

3. A typical method of securing an installed disk drive within the cage is to install a screw in the cage which acts as a stop to prevent removal of the disk drive assembly from the cage. This undesirably complicates and lengthens the individual disk drive installation and removal procedure.

4. Among other grounding-related problems, the necessary grounding between each disk drive and the sheet metal cage in which it is removably supported often requires fairly complex interconnections therebetween which tend to be rather tedious and time consuming to properly utilize. Additionally, the card edge hot plug socket interface area is normally exposed within the cage where it can be inadvertently touched by an installer trying to make alignment or other adjustments within the cage.

5. It is conventional to provide each disk drive with a plurality of indicating lights showing the operative state of the drive. However, under conventional practice, these indicating light arrays typically must be located on the support housing remote from the disk drives. This can lead to visual confusion as to which indicating lights are associated with which disk drive.

These problems, limitations and disadvantages have been overcome by a specially designed disk drive tray/support cage mounting structure illustrated and described in U.S. Pat. No. 5,340,340 which is incorporated by reference in its entirety in the present application. The mounting structure basically comprises a molded plastic support tray to the top side of which a hard disk drive is directly anchored.

Opposite side edges of the tray body project outwardly beyond opposite sides of the mounted disk drive and are slidably receivable in plastic guide channels within the cage. When the disk drive is fully inserted into the cage a small connector circuit board on a rear end portion of the tray is hot-plug coupled to a connector on a vertical rear end wall of the cage, and a pair of latch arms on the front end of the tray can be engaged with opposite front channel portions of the cage to releasably lock the inserted disk drive support tray within the interior of the cage structure.

Despite the various advantages provided by this support tray/cage structure, in further developing the structure it has become desirable to improve it by providing a more stable, handling shock reducing structure for mounting the disk drive on the tray to improve the disk drive operational characteristics (particularly the operational characteristics of a high performance disk drive); to provide for improved relative alignment between the cage structure and the inserted support tray structure; and to provide at least partial operational EMI shielding for the mounted disk drive. It is accordingly an object of the present invention to provide such improved tray-based disk drive mounting apparatus.

SUMMARY OF THE INVENTION

In carrying out principles of the present invention, in accordance with a preferred embodiment thereof, improved disk drive apparatus is provided for use in conjunction with a housing cage structure having an open front end, and an end wall spaced rearwardly apart from and facing the open end and having a plug socket thereon. The disk drive apparatus is insertable rearwardly through the open housing cage structure front end, in a manner removably holding the disk drive apparatus therein and operatively coupling it to the plug socket, and includes a support tray member having a rear end portion and a top side portion disposed forwardly of the rear end portion. The support tray member is representatively a plastic molding and is rearwardly movable inwardly through the open housing cage structure end, toward the plug socket on its end wall, to an operating position.

A mounting plate, representatively of a metal construction, is spaced apart from the support tray member top side portion in an overlying, parallel, facing relationship therewith, the mounting plate having a top side and a rear end portion. Fastening means are provided for securing the mounting plate to the support tray member top side portion. Additionally, resilient means are captively retained between the mounting plate and the support tray member top side portion and project downwardly beyond the support tray member to provide for handling shock absorption for a disk drive secured atop the mounting plate when the tray/plate assembly is, for example, placed on a support surface outside of the housing cage structure. Securing means are also provided and function to removably secure a disk drive to the top side of the mounting plate.

A printed circuit board having a connector edge portion and being electrically coupled to the disk drive is removably mounted on the rear end portion of the mounting plate for movement therewith in a manner such that when the support tray member is rearwardly moved through the cage structure to the aforementioned operating position the connector edge portion of the mounted printed circuit board is conductively and removably received within the plug socket. Support means are associated with the mounting plate and are cooperatively engageable with a portion of the housing cage structure, in response to movement of the support tray member into the housing cage structure to the tray member operating position, to removably support the support tray member within the housing cage structure.

Preferably, the resilient means include a spaced plurality of elastomeric cushioning members having first portions captively retained between the mounting plate and the top side portion of the support tray member, and second portions projecting downwardly from the bottom side of the support tray member, and the fastening means include a spaced plurality of plastic post portions slidably extending upwardly through corresponding holes in the mounting plate and having laterally enlarged upper end sections that overlie the mounting plate and captively secure it to the underlying support tray member.

In the preferred embodiment of the overall invention, the mounting portion of the cage structure includes an opposing pair of horizontally oriented guide channel members internally disposed within the cage structure, and the support means include opposite side edges of the mounting plate that are slidably insertable into and through the guide channel member interiors. According to a feature of the invention, ramped projection means are formed on the top side of these side edge portions and are operative to engage interior surface portions of the guide channel members in a manner aligning the support tray to compensate for horizontal and vertical dimensional inaccuracies in the guide channel members.

The metal plate thus performs in the overall apparatus four desirable functions— (1) it forms a more stable platform for the mounted disk drive and thereby improves its performance and data throughput accuracy, (2) it forms an EMI radiation shield beneath the supported disk drive, (3) it serves to compensate for undesirable dimensional inaccuracies in the internal tray support structure within the cage that receives the mounted disk drive, and (4) together with the elastomeric members, it helps to reduce the handling shock imposed on the mounted disk drive.

DETAILED DESCRIPTION

This application discloses subject matter similar to that illustrated and described in U.S. Pat. No. 5,340,340 which is hereby incorporated by reference herein.

Figure 1:
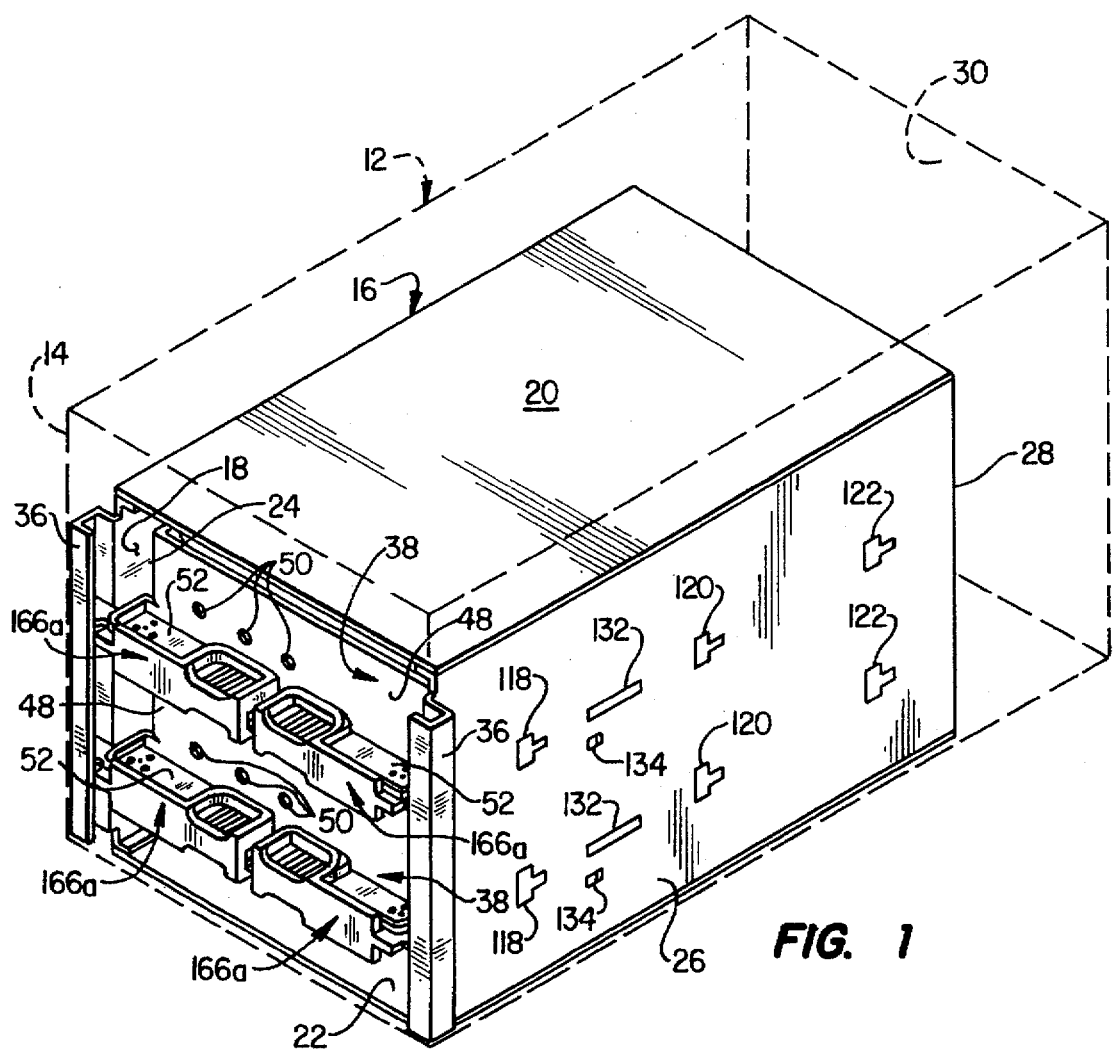
FIG. 1 is a partially phantomed, simplified perspective view of a representative external, hot-plug connection hard disk drive outer housing structure removably supporting therein a plurality of mounted hard disk drive structures embodying principles of the present invention.
Figure 2:
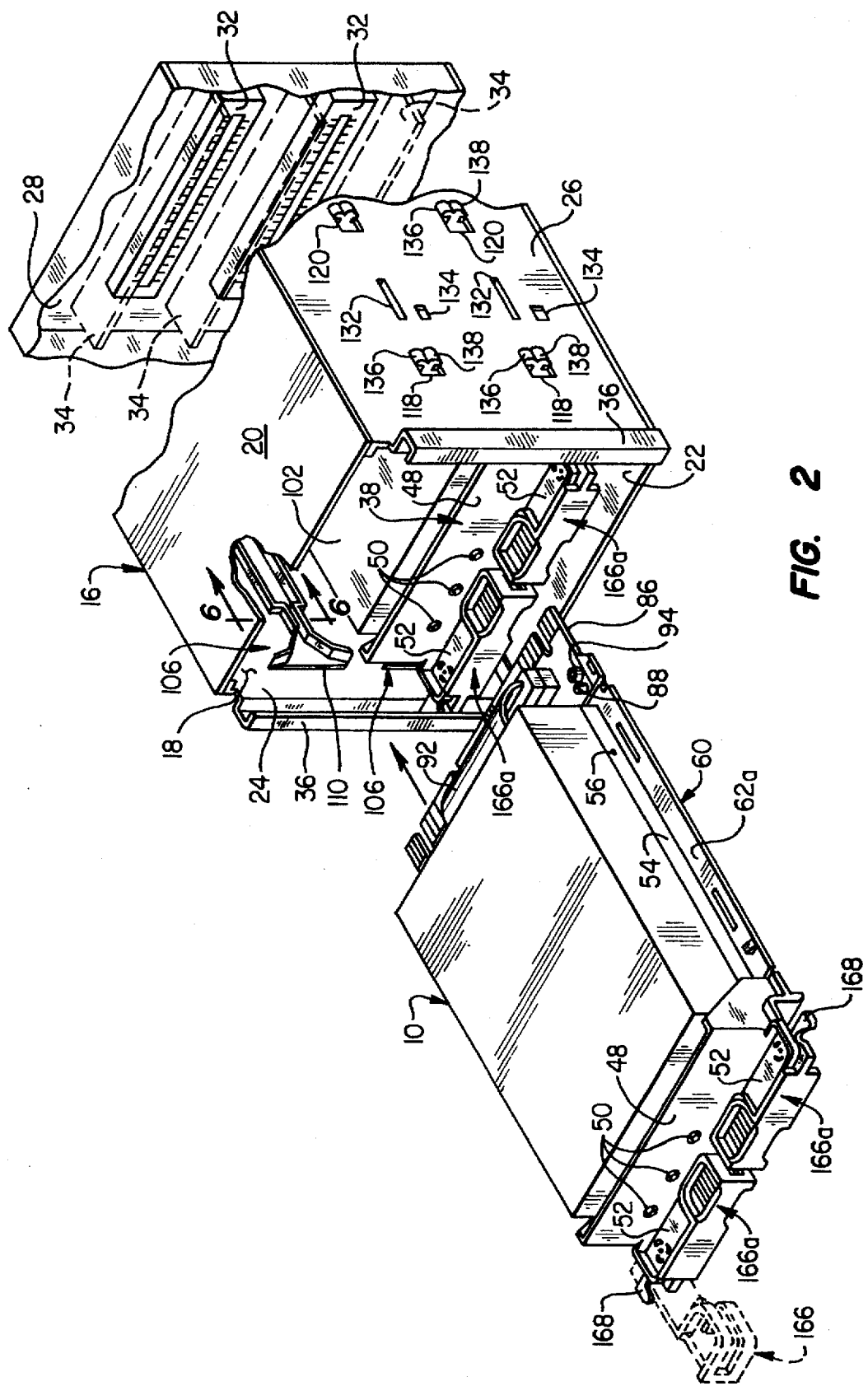
FIG. 2 is an enlarged scale partially exploded fragmentary perspective view of an interior sheet metal cage portion of the housing, with one of the tray-mounted disk drives removed therefrom.

Referring initially to FIGS. 1 and 2 of the drawings, in a preferred embodiment thereof the present invention provides apparatus for removably supporting and providing hot plug connections for a vertically spaced plurality of disk drives 10 (FIG. 2) such as those externally utilized in conjunction with a file server (not shown) or other computer device. The support apparatus representatively includes a generally rectangular housing 12 having an open front end 14, and a generally rectangular sheet metal cage structure 16 disposed within the housing.

Cage 16 has an open front end 18 rearwardly adjacent the housing end 14, top and bottom walls 20 and 22, left and right side walls 24 and 26, and a rear end wall 28 spaced inwardly apart from the rear end wall 30 of housing 12. A vertically spaced pair of horizontally elongated hot plug sockets 32 are mounted on the rear cage end wall 28 (FIG. 2).

Three vertically spaced, horizontally elongated rectangular guard plate members 34 project forwardly beyond the rear cage end wall 28, with each of the sockets 32 being disposed between and parallel to a vertically adjacent pair of the plates 34. Front end portions of the cage side walls 24,26 are bent to form a pair of vertically extending wall channel portions 36 having generally U-shaped cross-sections along their lengths, and horizontally facing open sides.

Referring now to FIGS. 1–4, each of the disk drives 10 is supported on the top side of one of a specially designed pair of molded plastic support trays 38 each having a generally rectangular plate-like body 40. Body 40 has a series of cooling holes 42 formed therethrough; a vertically thinner, downwardly offset rear end portion 44 (see FIG. 4); an upwardly projecting front end plate portion 48 with three LED disk drive activity indicating lights 50 mounted thereon; and a pair of opposite front corner portions 52 projecting outwardly beyond the lower side edge of the front end plate 48.

Each disk drive 10 is of a conventional construction and has a pair of mounting rail sections 54 extending forwardly and rearwardly along opposite lower side portions thereof. Metal grounding screws 56 are connected to and project outwardly from the mounting rails adjacent their rear ends. When each disk drive 10 is operatively mounted atop the body portion 40 of its associated support tray 38, as later described herein, the disk drive is positioned between the plate 48 and the rear end portion 44 of the tray body.

The plastic support trays 38 are similar to those illustrated and described in the aforementioned U.S. Pat. No. 5,340,340 but are additionally provided with a specially designed disk drive shock reducing assembly 60 that functions to (1) protect the mounted hard disk drive 10 against shock in handling, (2) provide partial EMI shielding for the disk drive, and (3) automatically compensate for horizontal and vertical dimensional inaccuracies associated with subsequently described internal cage mounting structures into which the tray 38 is slidingly received.

Figure 3:
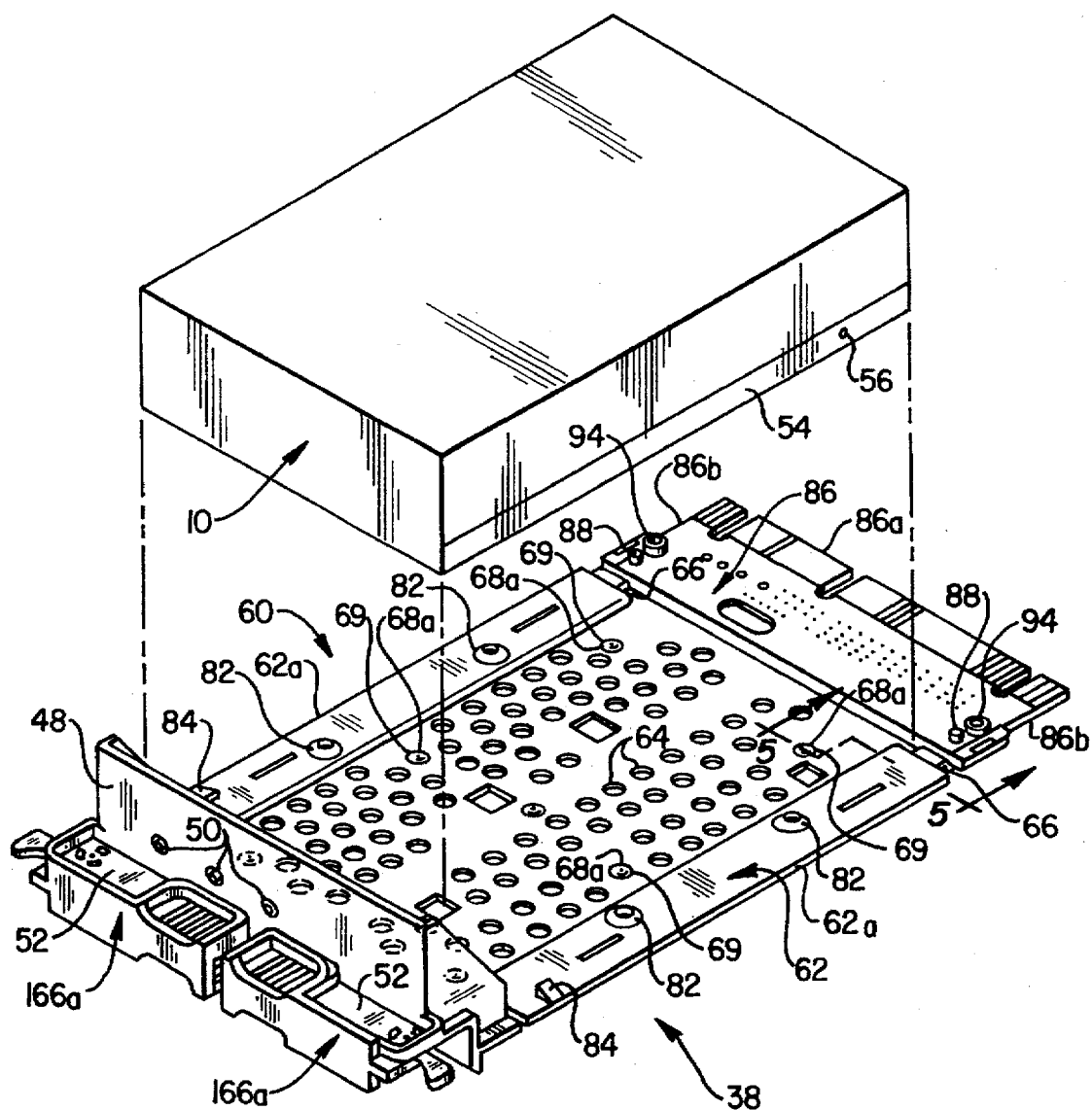
FIG. 3 is an enlarged perspective view of the removed FIG. 2 disk drive upwardly removed from its underlying mounting tray structure.
Figure 4:
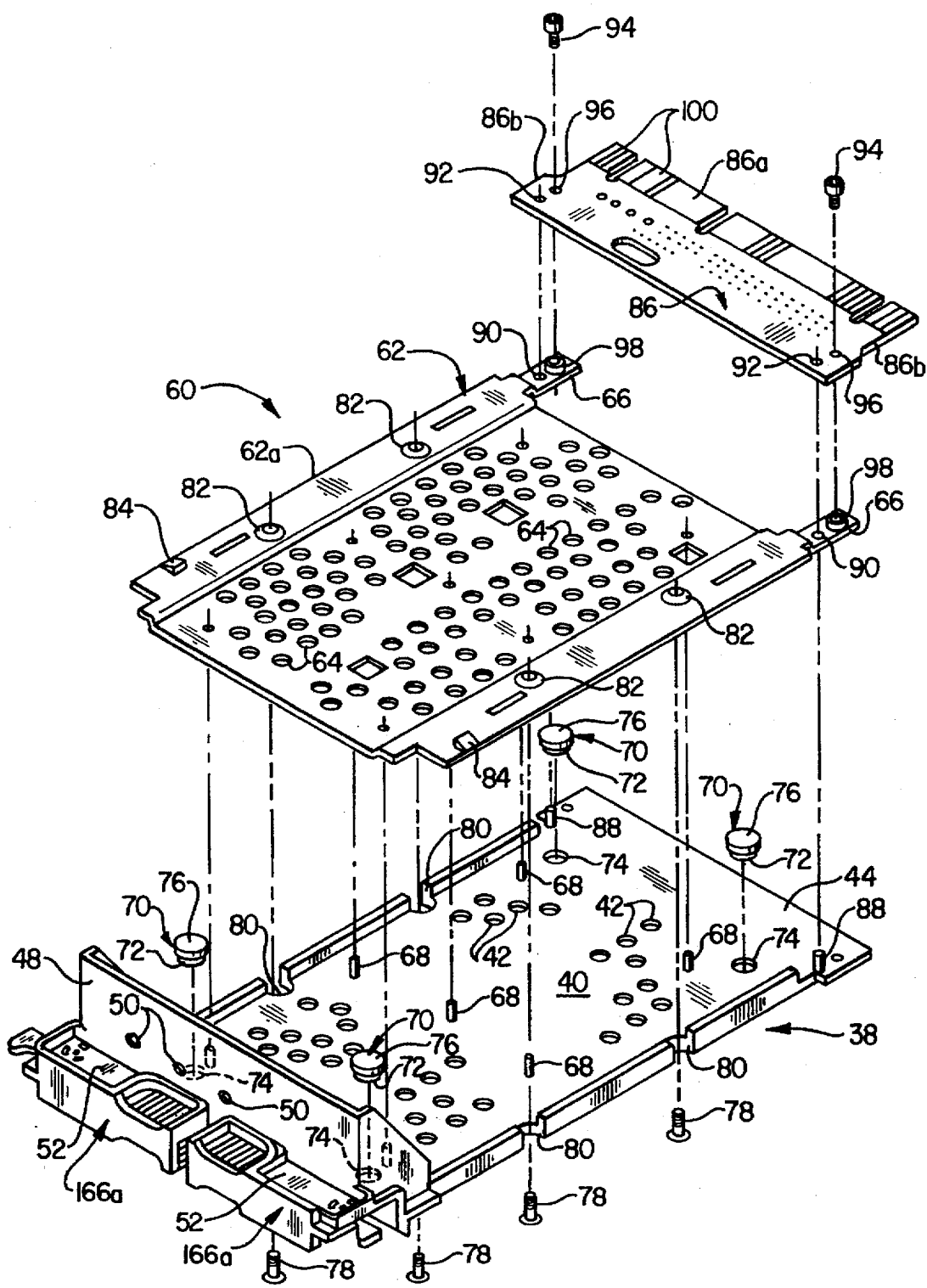
FIG. 4 is a slightly reduced scale exploded perspective view of the FIG. 3 mounting tray structure.

Turning now to FIGS. 3 and 4, the assembly 60 includes a relatively thin rectangular metal mounting plate 62 that, as shown, overlies the plastic tray body portion 40 and has opposite side edge portions 62a extending along its length, a series of cooling holes 64, and a downwardly offset rear corner end portions 66. Plate 62 is anchored to the top side of the plastic tray body by means of a spaced series of upwardly projecting, molded-in post portions 68 extending upwardly from the top side of the plastic tray body 40 as shown in FIG. 4.

Post portions 68 pass upwardly through corresponding mounting holes 69 in the metal plate 62 and have upper end portions 68a (see FIGS. 3 and 5) which are suitably enlarged, and overlie the topside of the plate 62, to thereby anchor the plate 40 to the underlying plastic tray body 40. The assembly 60 also includes a plurality of elastomeric cushioning members 70 (see FIGS. 4 and 5), representatively four in number, that are interposed and captively retained between the metal plate 62 and the underlying plastic tray body 40. Each cushioning member 70 has a lower cylindrical body portion 72 that is extends downwardly through a corresponding circular hole 74 in the plastic tray body 40, and extends downwardly beyond the underside of the tray body 40, and a diametrically enlarged upper head portion 76 captively retained between the metal plate 62 and the underlying plastic tray body 40 within a complementarily configured recess 76a formed in the top side of the tray body 40.

Each disk drive 10 is removably anchored to the top side of the metal plate 62, forwardly of its rear end portions 66, by means of four screws 78 (see FIG. 4) that extend upwardly through side notches 80 in the plastic tray body side edge portions 62a, upwardly through raised boss portions 82 on the top side of the plate 62, and are threaded into the underside of the disk drive 10. For purposes later described, two upwardly ramped, generally wedge-shaped projections 84 are formed on the top sides of the metal plate side edge portions 62a adjacent their forward ends.

Still referring to FIGS. 3 and 4, an elongated rectangular connector circuit board 86 is removably secured to the top side of the rear metal plate end portion 66 by means of upwardly projecting post portions 88 formed on the rear tray body end portion 44 and extending upwardly through aligned holes 90,92 respectively formed in the metal plate end portion 66 and a front side edge portion of the circuit board 86, and a pair of screws 94 that are extended downwardly through circuit board holes 96 and downwardly threaded into upwardly projecting boss portions 98 on the top side of the rear metal plate end portion 66.

The circuit board 86 has a rear side edge portion 86a having electrical connector traces 100 formed thereon. When the tray-mounted disk drive 10 is slidably inserted into the cage structure 16 as later described herein the rear side edge portion 86a of the circuit board 86 is matingly forced into the hot plug socket 32 aligned therewith. As will be appreciated, the circuitry on the board 86 is operatively coupled to the mounted disk drive 10 by appropriate connecting structure (not shown). An example of such connecting structure is illustrated and described in U.S. Pat. No. 5,340,340 incorporated by reference herein.

Figure 6:
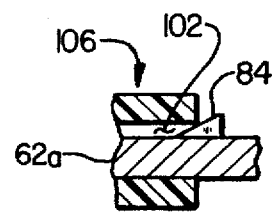
FIG. 6 is an enlarged partial cross-sectional view through a cage guide channel member along line 6—6 of FIG. 2, and illustrates the receipt in the guide channel member of an edge alignment portion of the mounting tray structure.

With reference now to FIGS. 2, 3 and 6, each tray mounted disk drive 10 is operatively inserted into the cage structure 16 by placing opposite end edge portions of the connector circuit board 86 into the open-sided interior areas 102 of a facing pair of horizontally extending guide channel members 106 respectively mounted on the interior surfaces of the vertical side walls 24,26 of the cage structure 16 (only the guide channel members 106 on the side wall 24 being visible in FIG. 2). The tray structure 38 is then pushed rearwardly into the interior of the cage 16 in a manner causing the metal plate member side edge portions 62a to slidably traverse the interiors 102 of the pair of guide channel members 106 until the connector circuit board rear side edge portion 86a is removably and operatively plugged into an associated hot plug connector 32 on the rear wall 28 of the cage structure 16.

When the tray-mounted disk drive 10 is fully and operatively inserted into the interior of the cage 16, it is releasably held in place therein by a pair of pivotally mounted latch arm members 166a pivotally mounted on the front end of the plastic tray structure 38 and releasably lockable to the wall channel portions 32 of the cage structure 16. The latch arm members 166a, as well as the guide channel members 106, are similar to those illustrated and described in U.S. Pat. No. 5,340,340 incorporated by reference herein.

As previously mentioned, the assembly 60 provides a unique combination of three functions— (1) protecting the mounted disk drive against shock during handling, (2) providing EMI shielding and grounding for the disk drive, and (3) compensating for vertical and horizontal dimensional inaccuracies in the structure which supports the inserted tray/disk drive apparatus in the cage.

Figure 5:
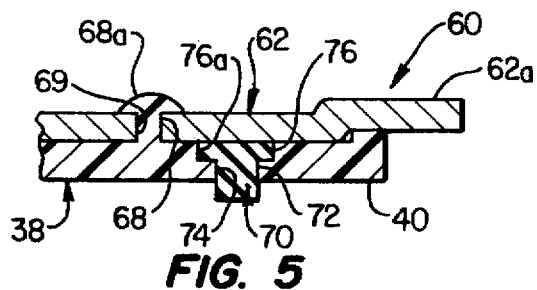
FIG. 5 is an enlarged scale cross-sectional view through the mounting tray structure taken along line 5—5 of FIG. 3.

Referring now to FIGS. 4 and 5 it can be seen that the metal plate 62, to the top side of which the disk drive 10 is rigidly connected by the screws 78, is supported on the top side of the plastic tray body 40 over the elastomeric cushioning members 72 captively retained between the plate 62 and the tray body 40 as previously described, with the plastic tray posts 68 being slidingly received in their associated metal plate holes 69 and the lower portions 72 of the members 70 projecting downwardly beyond the lower side of the tray body 40. The downwardly projecting elastomeric member portions 72 conveniently form support legs for protecting the mounted disk drive from handling shock when, for example, the tray/plate assembly is set down on a support surface exterior to the cage structure.

As best illustrated in FIG. 6, when the ramped, wedge-shaped top side projections 84 on the metal plate side edge portions 62a enter the interior areas 102 of their associated guide channel members 106, they advantageously function (by engaging upper interior side portions of the guide channel members) to compensate for vertical and horizontal dimensional inaccuracies in the guide channel members in a manner substantially reducing, if not totally eliminating, undesirable vertical and side edge-to-side edge mounting "play" in the operatively inserted disk drive/mounting tray assembly 10,38. Additionally, the metal plate member 62 serves as a bottom side EMI shield structure for each mounted disk drive 10 to reduce the EMI radiation outwardly generated therefrom.

The foregoing detailed description is to be clearly understood as being given by way of illustration and example only, the spirit and scope of the present invention being limited solely by the appended claims.

What is claimed is:

1. For use in conjunction with a housing cage structure having an open end, and an end wall spaced rearwardly apart from and facing the open end and having a plug socket thereon, disk drive apparatus insertable rearwardly through the open housing cage structure end in a manner removably holding said disk drive apparatus therein and operatively coupling it to the plug socket, said disk drive apparatus comprising:

a support tray member having a rear end portion and a top side portion disposed forwardly of said rear end portion, said support tray member being rearwardly movable inwardly through the open housing cage structure end, toward the plug socket on its end wall, to an operating position;

a mounting plate spaced apart from said support tray member top side portion in an overlying, parallel, facing relationship therewith, said mounting plate having a top side and a rear end portion;

fastening means for securing said mounting plate to said support tray member top side portion;

means captively retained between said mounting plate and said support tray member top side portion and protruding downwardly from the bottom side of said support tray member to form resilienty handling shock absorbing projections thereon;

means for securing a disk drive to said top side of said mounting plate;

a printed circuit board having a connector edge portion;

means for mounting said printed circuit board on said rear end portion of said mounting plate for movement therewith in a manner such that when said support tray member is rearwardly moved through the cage structure to said operating position said connector edge portion of the mounted printed circuit board is conductively and removably received within the plug socket;

coupling means for electrically coupling said printed circuit board to the disk drive; and support means associated with said mounting plate and cooperatively engageable with a portion of the housing cage structure, in response to movement of said support tray member into the housing cage structure to said operating position, to removably support said support tray member within the housing cage structure.

2. The disk drive apparatus of claim 1 further comprising:

a disk drive secured by said securing means to said top side of said mounting plate forwardly of said printed circuit board.

3. The disk drive apparatus of claim 2 wherein:

said disk drive supported on said top side of said mounting plate is a hard disk drive.

4. The disk drive apparatus of claim 1 wherein:

said support tray member is of a molded plastic construction, and said mounting plate is a metal material and forms an EMI shield structure beneath a disk drive mounted on said top side thereof.

5. The disk drive apparatus of claim 1 wherein:

said portion of the housing cage structure comprises an opposing pair of horizontally extending guide channel members, and said mounting plate has a pair of opposite side edge portions configured to be slidably received in the guide channel members for forward and rearward movement through the interiors thereof.

6. The disk drive apparatus of claim 5 further comprising:

ramped projection means formed on the top side of said mounting plate side edge portions and operative to engage interior surface portions of the guide channel members in a manner aligning said support tray to compensate for horizontal and vertical dimensional inaccuracies in the guide channel members.

7. The disk drive apparatus of claim 1 wherein said resilient means include:

a spaced plurality of elastomeric cushioning members having first portions captively retained between said mounting plate and said top side portion of said support tray member, and second portions projecting downwardly beyond the bottom side of said support tray member.

8. The disk drive apparatus of claim 7 wherein:

said fastening means include a first spaced plurality of holes formed in said mounting plate, and a spaced plurality of post portions projecting upwardly from said top side portion of said support tray member and slidingly extending through said first plurality of holes, said post portions having transversely enlarged upper end sections overlying said top side of said mounting plate.

9. The disk drive apparatus of claim 8 wherein:

said support tray member has a second plurality of holes formed therein, and said elastomeric cushioning members have cylindrical body portions extending downwardly through said second plurality of holes, and enlarged cylindrical head portions captively retained between said top side portion of said support tray member and said mounting plate in complementarily configured recesses formed in said top side portion of said support tray member.

10. For use in conjunction with a housing cage structure having an open end, and an end wall spaced rearwardly apart from and facing the open end and having a plug socket thereon, disk drive apparatus insertable rearwardly through the open housing cage structure end in a manner removably holding said disk drive apparatus therein and operatively coupling it to the plug socket, said disk drive apparatus comprising:

a molded plastic support tray member having a rear end portion and a top side portion disposed forwardly of said rear end portion, said support tray member being rearwardly movable inwardly through the open housing cage structure end, toward the plug socket on its end wall, to an operating position, said support tray member having a spaced plurality of post portions projecting upwardly from said top side portion thereof, said post portions having transversely enlarged upper end portions, said support tray further having a first spaced plurality of holes formed therein;

a metal mounting plate spaced apart from said support tray member top side portion in an overlying, parallel, facing relationship therewith, said mounting plate having a second spaced plurality of holes formed therethrough, a top side, and a rear end portion, said post portions slidingly extending upwardly through said second spaced plurality of holes and having transversely enlarged outer end sections outwardly overlying said top side of said mounting plate;

a spaced plurality of elastomeric members captively retained between said mounting plate and said top side portion of said support tray member and extending downwardly beyond the bottom side of said support tray member;

a hard disk drive secured to said top side of said mounting plate;

a printed circuit board having a connector edge portion;

means for mounting said printed circuit board on said rear end portion of said mounting plate for movement therewith in a manner such that when said support tray member is rearwardly moved through the cage structure to said operating position said connector edge portion of the mounted printed circuit board is conductively and removably received within the plug socket;

coupling means for electrically coupling said printed circuit board to said disk drive; and support means associated with said mounting plate and cooperatively engageable with a portion of the housing cage structure, in response to movement of said support tray into the housing cage structure to said operating position, to removably support said support tray member within the housing cage structure.

11. The disk drive apparatus of claim 10 wherein:

said portion of the housing cage structure comprises an opposing pair of horizontally extending guide channel members, and said support means include a pair of opposite side edge portions of said mounting plate configured to be slidably received in the guide channel members for forward and rearward movement through the interiors thereof.

12. The disk drive apparatus of claim 11 further comprising:

ramped projection means formed on the top side of said mounting plate side edge portions and operative to engage interior surface portions of the guide channel members in a manner aligning said support tray to compensate for horizontal and vertical dimensional inaccuracies in the guide channel members.

13. Apparatus for supporting and providing a plug connection for a disk drive, comprising:

a housing cage structure having an open front end, a rear end wall having a plug socket thereon, and first and second opposite side walls extending between said open front end and said rear end wall, said first and second opposite side walls having facing surfaces;

a facing pair of horizontally oriented guide channel members mounted on said first and second opposite side walls and having interior surfaces;

a plastic support tray member having a rear end portion and a top side portion disposed forwardly of said rear end portion, said support tray member being rearwardly movable inwardly through the open front housing end to an operating position;

a metal mounting plate spaced apart from said support tray member top side portion in an overlying, parallel, facing relationship therewith, said mounting plate having a top side, a rear end portion, and a pair of opposite side edges slidably movable longitudinally into and through said guide channel members to support said mounting plate thereon;

fastening means for securing said mounting plate to said support tray member top side portion in a manner permitting relative transverse movement thereof toward and away from one another;

means captively retained between said mounting plate and said support tray member top side portion and extending transversely outwardly through the bottom side of said support tray member for forming resilient shock absorbing projections thereon;

means for securing a disk drive to said top side of said mounting plate;

a printed circuit board having a connector edge portion;

means for mounting said printed circuit board on said rear end portion of said mounting plate for movement therewith in a manner such that when said support tray member is rearwardly moved through the cage structure to said operating position said connector edge portion of the mounted printed circuit board is conductively and removably received within the plug socket; and coupling means for electrically coupling said printed circuit board to the disk drive.

14. The apparatus of claim 13 further comprising:

a disk drive secured by said securing means to said top side of said mounting plate forwardly of said printed circuit board.

15. The apparatus of claim 14 wherein:

said disk drive supported on said top side of said mounting plate is a hard disk drive.

16. The apparatus of claim 13 further comprising:

ramped projection means formed on the top side of said mounting plate side edge portions and operative to engage interior surface portions of said guide channel members in a manner aligning said support tray to compensate for horizontal and vertical dimensional inaccuracies in said guide channel members.

17. The apparatus of claim 13 wherein said means for forming resilient shock absorbing projections include:

a spaced plurality of elastomeric cushioning members having first portions captively retained between said mounting plate and said top side portion of said support tray member and disposed within recesses formed in said top side portion of said support tray member.

18. The disk drive apparatus of claim 17 wherein:

said fastening means include a first spaced plurality of holes formed in said mounting plate, and a spaced plurality of post portions projecting upwardly from said top side portion of said support tray member and slidingly extending through said first plurality of holes, said post portions having transversely enlarged upper end sections overlying said top side of said mounting plate.

19. The apparatus of claim 18 wherein:

said support tray member has a second plurality of holes formed therein, and said elastomeric cushioning members have body portions extending downwardly through said second plurality of holes and projecting downwardly beyond the bottom side of said support tray member, and diametrically enlarged head portions captively retained in said recesses.

\* \* \* \* \*